Patented Apr. 19, 1932

1,855,090

UNITED STATES PATENT OFFICE

RICHARD BRANDT, OF BERGEDORF, NEAR HAMBURG, GERMANY

METHOD OF OBTAINING POTASSIUM AND/OR SODIUM FERROCYANIDE IN THE PURIFICATION OF COAL GAS

No Drawing. Application filed March 27, 1930, Serial No. 439,528, and in Germany April 7, 1928.

Of the numerous proposed methods of converting hydrocyanic acid into the more valuable alkali ferro-cyanides, particularly potassium ferro-cyanide, in the purification of coal gas, so far none has found favour in the gas industry.

For example, according to one known method it has been proposed, particularly for obtaining soluble ferro-cyanogen compounds, to wash coal gases containing cyanogen with a mud composed of iron compounds and suitable quantities of materials having an alkaline reaction. The same result is intended to be obtained by another process in which a mixture of a mud of precipitated ferrous carbonate and soda or potash is utilized for washing the gas.

These processes were not economically successful because along with soluble potassium or sodium ferro-cyanide there are also produced insoluble ferro-cyanides. For the complete conversion of the absorbed hydrocyanic acid into soluble ferro-cyanides it was found necessary to remove carbonic acid from the gas to be purified (see Bertelsmann "Die Fabrikation der Cyanverbindungen", 1906, page 230, line 13).

Now the present invention solves for the first time the problem of obtaining alkali ferro-cyanides, particularly potassium ferrocyanide, in a satisfactory and economic manner. Although this process utilizes known operations and chemical reactions, it is differentiated in principle from the prior practice first, in regard to the state of the coal gas at the washing stage and second, in regard to the use of the reagents in question.

In my process after separation of tar, naphthaline, etc. and before the cyanogen purification the gas is washed with water for the purpose of removing ammonia therefrom. The gas thus still contains sulphuretted hydrogen, hydrocyanic acid, carbonic acid (carbon dioxide) etc. as impurities.

Now in the presence of sulphuretted hydrogen and carbonic acid in the gas the cyanogen purification is effected by means of an aqueous mud of divalent iron compounds and caustic alkali (potassium or sodium) depending on whether potassium ferro-cyanide or sodium ferro-cyanide is to be obtained. A certain ratio of iron and alkali metal is maintained in the absorption liquid, there being for one atom of Fe five atoms K, the former in the form of $Fe(OH)_2$ or $FeCO_3$ or $FeS$ and the latter as $KOH$ or $K_2CO_3$. There is thus an excess of about 25% or more of alkali beyond the theoretical requirements, since, according to the formula $K_4FeCN_6$, four atoms K are necessary for one atom Fe. This excess of alkali in the washing liquor is to be determined by the amount of hydrocyanic acid in the gas.

The necessary divalent iron compounds are produced for example by the conversion of iron sulphate or chloride with milk of lime, soda or ammoniated water obtained from a previous stage of purification. The precipitation of the iron is best effected at a temperature of 80 to 90° C. as there is then obtained a precipitate which can readily deposit and which can be purified by decanting without the necessity for oxidising by atmospheric oxygen. It may be stated that the operation may be effected also at normal temperature or at a moderately elevated temperature.

If now the liquor or mud of the composition indicated above is systematically and continuously circulated counter current to the flow of the gas through say five chambers of a rotary washer (for example of the Bamag or other system), then with suitable regulation depending on the quantity of gas to be purified and its content of hydrocyanic acid a certain quantity of the total alkali is used up in dissolving the suspended iron to form complex soluble ferro-cyanogen compounds, unconsumed alkali remaining in the liquor being converted to potassium carbonate or bi-carbonate, mainly carbonate, due to absorption of carbonic acid.

The solution flowing from the washer is separated from the unconverted mud and the latter can be returned to the process.

For the purpose of further treatment the solution is first heated, then filtered and then thickened up to 30 to 32° Bé. or more, and subjected to crystallization. On boiling and evaporating the solution any thiocyanic acid, and sulphuretted hydrogen present is driven off so that in this first crystallization there is obtained a relatively pure preliminary product of potassium ferro-cyanide or sodium ferro-cyanide.

The cold solution separated from the crystallized product contains about 4 to 6% potassium or sodium ferro-cyanide and about 25% potash or soda. This mother liquor strong in alkali is used along with additional alkali to constitute a fresh quantity of washing liquor of the composition previously stated. That part of the alkali which is recovered in the evaporation of the lye is utilized afresh in the washing process which is otherwise conducted continuously or as nearly so as possible.

What is claimed is:

In the process of obtaining alkali-metal ferrocyanides from coal gas which usually contains hydrocyanic acid, ammonia, carbon dioxide, and other impurities, from which gas the entire ammonia content has first been substantially removed, the step of subjecting the gas to the action of an absorption liquor passing in countercurrent relation to the gas, said absorption liquor containing ferrous compounds and alkaline alkali-metal compounds, the latter being substantially 25% in excess of that amount which is necessary to react with the ferrous compounds to form alkali-metal ferrocyanides.

In testimony whereof I have signed my name to this specification.

RICHARD BRANDT.